United States Patent
Gu et al.

(10) Patent No.: US 6,895,178 B2
(45) Date of Patent: May 17, 2005

(54) VAPOR DELIVERY SYSTEM

(75) Inventors: Youfan Gu, Superior, CO (US); Paul Dozoretz, Hudson, CO (US); Benjamin Goss, Boulder, CO (US); David Neumeister, Loveland, CO (US); James Mueller, Lafayette, CO (US); Donald W. Higgins, Hudson, NH (US)

(73) Assignee: MKS Instruments, Inc., Wilmington, MA (US)

( * ) Notice: Subject to any disclaimer, the term of this patent is extended or adjusted under 35 U.S.C. 154(b) by 210 days.

(21) Appl. No.: 10/196,572

(22) Filed: Jul. 16, 2002

(65) Prior Publication Data

US 2003/0063901 A1 Apr. 3, 2003

Related U.S. Application Data

(60) Provisional application No. 60/305,990, filed on Jul. 16, 2001.

(51) Int. Cl.[7] .................................................. F24F 6/00
(52) U.S. Cl. ...................................... 392/394; 392/403
(58) Field of Search ................................ 372/386–388, 372/391, 394, 396, 400, 407, 325, 449; 159/22

(56) References Cited

U.S. PATENT DOCUMENTS 5,630,913 A    5/1997   Tajer-Ardebili ............. 202/176

FOREIGN PATENT DOCUMENTS

| EP | 1 047 113 | 10/2000 |
|----|-----------|---------|
| WO | WO 01/12300 | 2/2001 |

OTHER PUBLICATIONS

MKS Instruments, "Vapor on Demand Module" Bulletin, 4 pages.

*Primary Examiner*—Thor Campbell
(74) *Attorney, Agent, or Firm*—Cochran Freund & Young; James R. Young

(57) ABSTRACT

The present invention provides a vapor delivery system and method for efficiently producing water vapor on demand. More particularly, the present invention produces low-temperature water vapor, without the formation of ice, by maintaining a sufficient volume of water at a sufficient temperature within a vaporizer chamber when the pressure in the vaporizer chamber is lowered.

28 Claims, 5 Drawing Sheets

VAPOR DELIVERY SYSTEM

CROSS-REFERENCE TO RELATED APPLICATIONS

The present application claims the benefit of U.S. Provisional Application Serial No. 60/305,990, filed Jul. 16, 2001.

BACKGROUND OF THE INVENTION

There has been a great deal of effort spent in trying to design and build practical, efficient and effective water vapor delivery systems for delivering water vapor at precisely controlled mass flow rates and pressures for use in a variety of applications, including converting harmful chemical byproducts to safer compounds for disposal in an environmentally sound manner. For example, when perfluorocarbons (PFCs), such as $CF_4$ and $C_2F$ are used in certain semiconductor fabrication processes, PFC byproducts in the effluent of such fabrication processes must be treated prior to release because they may contribute to the deterioration of the protective ozone layer above the earth's atmosphere. A Plasma reaction of such PFC byproducts with water vapor converts the PFCs to hydrogen fluoride (HF), carbon dioxide ($CO_2$) and water vapor ($H_2O$), which are harmless and can be released, and is thus an attractive method of handling the PFC disposal problem. Water vapor for such reactions may be provided by conventional water vapor deliver systems that function under relatively normal pressure conditions to provide water vapor at or above about 100° C. The water vapor produced by such systems is generally delivered to a plasma reaction chamber by attaching a pump to the vapor delivery system.

There are several drawbacks to using these conventional water vapor delivery systems. First, traditional systems may require about forty watts of power to vaporize one gram of water. Thus, the energy required to vaporize water on a large scale may add significant costs to the manufacturing process. Further, there are a number of problems with metering vapor flow, recondensation of vapor, vapor pressure control, and the like that have contributed to the expense of vapor delivery systems.

A typical water vapor delivery system that may be used for such applications as CFC effluent conversion has an evaporation chamber equipped with a large number of very hot plates with enough surface area to transfer the heat required to vaporize water almost instantaneously to react with and convert the PFC byproducts. Liquid water is fed into the chamber via a liquid metering device at a flow rate suitable to provide just enough water for vaporizing at the desired water vapor delivery rate to the PFC reaction chamber.

There are various drawbacks to using this kind of system. First, the plates have to be maintained at very high temperatures to drive the almost instantaneous evaporation of water flowing into the chamber. This requires significant energy input that may result in increased manufacturing costs.

Second, the high water temperature needed to provide near instantaneous vaporization on very hot surfaces increases the effects of corrosion throughout the system's components, which may result in increased repair and replacement costs. Third, since the liquid flow into the chamber is metered instead of the vapor flow out of the chamber, the actual vapor flow rate out of the chamber may oscillate and prove unstable due to high pressure/temperature fluctuations and evaporation irregularities.

Further, the vapor delivery system requires the maintenance of an elevated temperature throughout all of the components so that vapor pressure will not be exposed to any "cool spots" within the flow route that could cause re-condensation. Further yet, the high temperature system poses a potential safety risk to system operators.

An alternate water vapor delivery system uses a water evaporation chamber to heat a larger quantity of water to a temperature high enough to provide vapor on demand in combination with a vapor or gas mass flow controller (MFC) in a vapor feed line to meter the amount of vapor that is allowed to flow out of the vaporization chamber to the PFC plasma reactor. While this type of system may overcome some of the drawbacks of the previously described system, it is still necessary to keep the entire system (including a relatively large amount of deionized (DI) water) at a continuously high temperature (e.g. between 90° C. and 140° C.), which drives up thermal costs and introduces safety concerns for workers interacting with such systems. Additionally, the duration of time required to keep DI water at an elevated temperature also yields a significant elevation of the corrosive profile of the DI water to a level high enough to adversely affect the system's components.

SUMMARY OF THE INVENTION

In one embodiment, the present invention includes a low-temperature vapor delivery system including a vaporizer chamber, a first control valve, a liquid level sensor, a heater, a temperature sensor and a control system. The vaporizer chamber is adapted to contain at least a minimum threshold volume of liquid water. The first control valve regulates the flow of liquid water in to the vaporizer chamber. The liquid level sensor senses the level of liquid water in the vaporizer chamber. The heater affects the temperature of the liquid water within the vaporizer chamber. The temperature sensor senses the temperature of the liquid water in the vaporizer chamber. The control system facilitates communication between the first control valve and the liquid level sensor, and the heater and the temperature sensor for maintaining the liquid water at at least the minimum threshold volume at at least a minimum threshold temperature, such that upon lowering the pressure in the vaporizer chamber below about 760 Torr, water vapor is produced within the vaporizer chamber without producing solid water.

In another embodiment, the present invention provides a method of delivering water vapor to an external system. At least a threshold volume of liquid water is maintained within a vaporizer chamber by sensing the level of the water in the chamber and regulating the flow of water into the chamber to maintain at least the minimum threshold volume. The liquid water in the vaporizer chamber is maintained at at least a minimum threshold temperature by sensing the temperature of the water in the chamber and providing sufficient heat to maintain at least the minimum threshold temperature. The pressure in the chamber is then lowered below about 760 Torr while substantially maintaining at least the minimum water volume threshold and minimum threshold temperature to produce water vapor at below about 100° C. without producing solid water. The delivery of the water vapor to the external source is then regulated.

DETAILED DESCRIPTION

Figure 1:
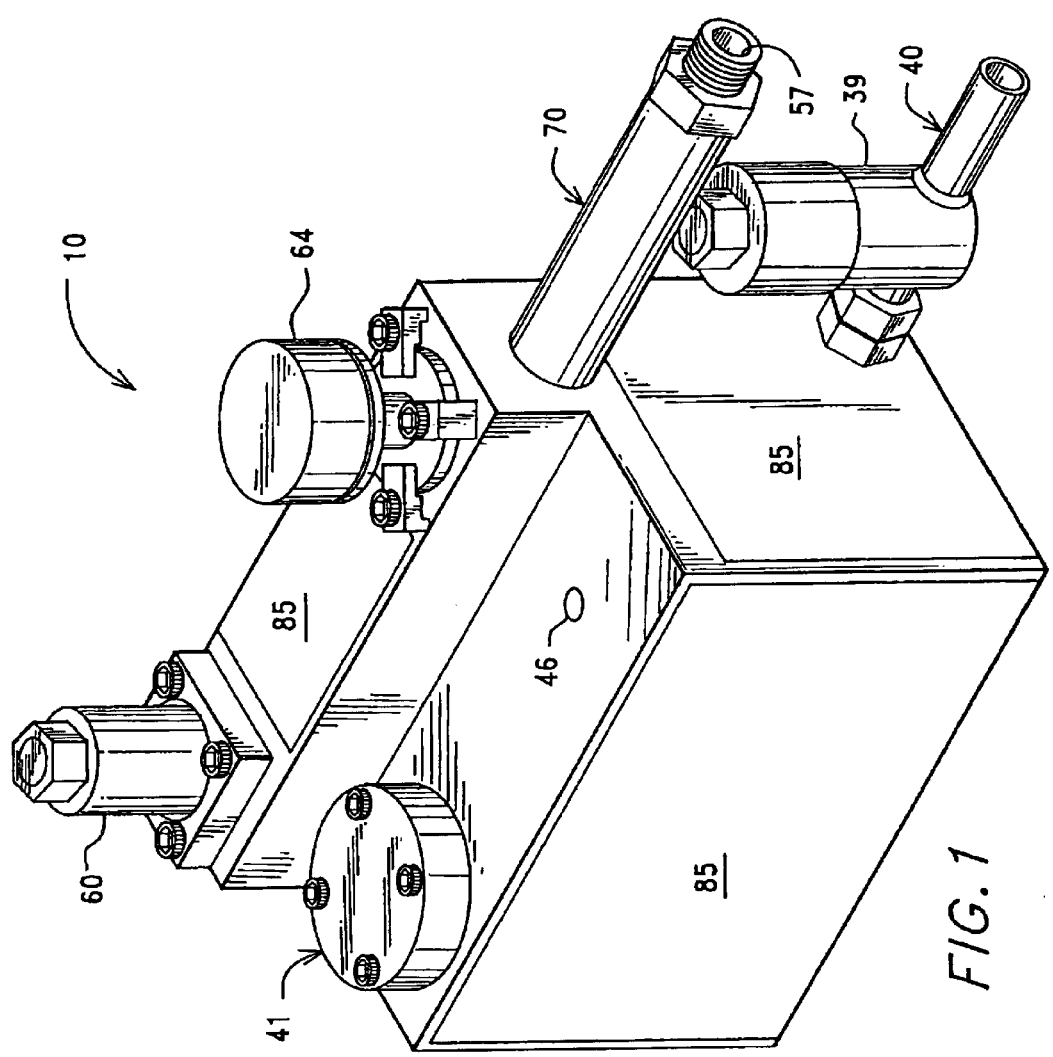
FIG. 1 is a perspective view of the water vapor delivery system.
Figure 2:
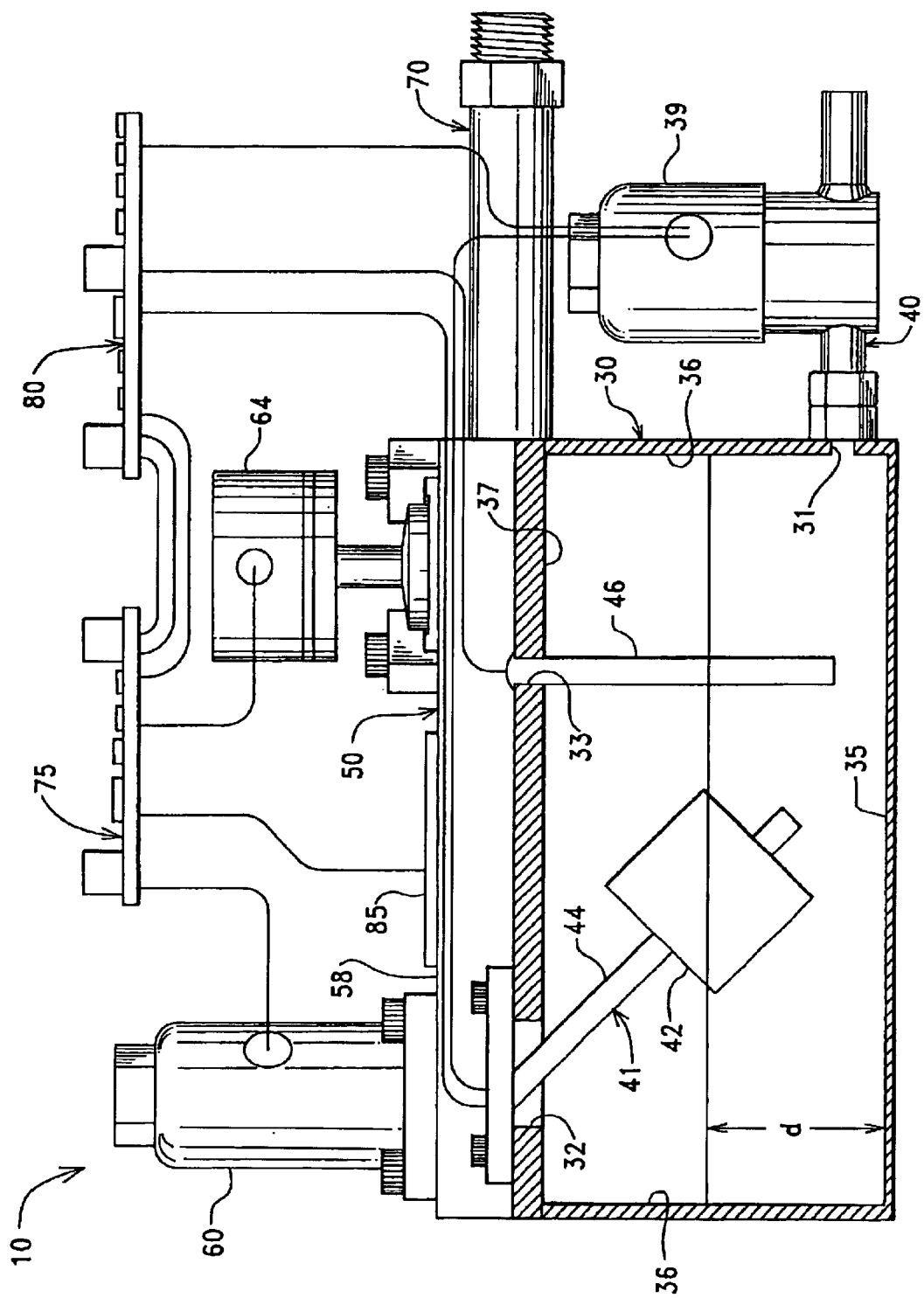
FIG. 2 is a front view of the water vapor delivery system of FIG. 1.
Figure 3:
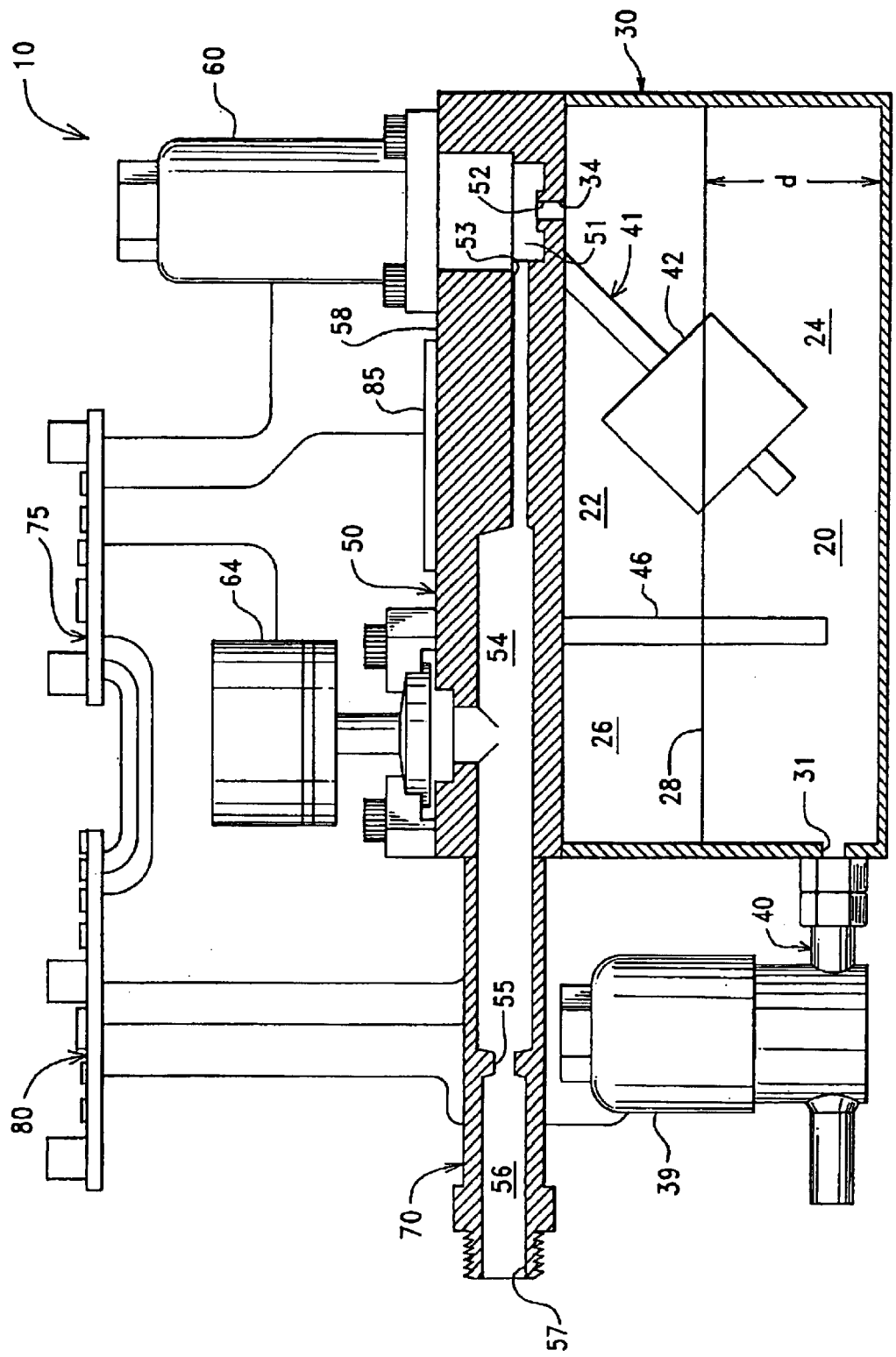
FIG. 3 is a cross-section of the water vapor delivery system of FIG. 1 as viewed from the back.

The water vapor delivery system 10 according to this invention is illustrated in FIGS. 1, 2, and 3. In general, the water vapor delivery system 10 includes a vaporizer chamber 30 and a flow meter device 50. The vaporizer chamber 30, which will be discussed in greater detail below, has a first orifice 31 that accepts an inlet line 40, a second orifice 34 that allows the outflow of water vapor, a third orifice 32 that accepts a liquid level sensor 41, and a fourth orifice 33 that accepts a temperature sensor 46.

The liquid level sensor 41 is inserted through third orifice 32 such that it extends downward into the vaporizer chamber 30. The liquid level sensor 41 may be any conventional liquid level sensing device. In the illustrated embodiments, the liquid level sensor 41 is oriented at a 45° angle to the top 37 of the vaporizer chamber 30. This allows the water vapor delivery system 10 to operate in either a generally horizontal or vertical orientation.

Figure 4:
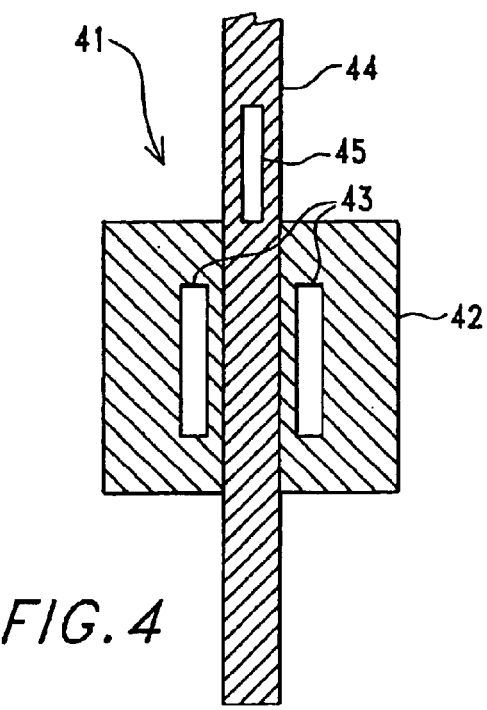
FIG. 4 is a cross-section of the liquid level sensor.

In the embodiment illustrated in FIG. 4, the liquid level sensor 41 has a float 42 at its end that is adapted to extend into the liquid water 20 within the vaporizer chamber 30. Within the float 42 is at least one magnet 43 positioned vertically and essentially parallel to the stem casing 44 of the liquid level sensor 41. Within the stem casing 44 is a Reed switch 45 which is magnetically closed when the liquid level line 28 is at or above a sufficient level for reliable operation of the water vapor delivery system 10, but will open if the liquid level line 28 is below the sufficient level.

The liquid level sensor 41 is adapted to communicate with a flow control valve 39, which is attached to the inlet line 40. The flow control valve 39 is adapted to regulate the rate of flow of the liquid water into vaporizer 30. The liquid level sensor 41 and the flow control valve 39 may communicate via a first printed circuit (PC) board 75 and/or a second PC board 80, each board having signal processing and control circuitry mounted to the system flow meter device 50.

Temperature sensor 46 is inserted through fourth orifice 33 such that it extends downward into vaporizer chamber 30. The temperature sensor 46 may be any conventional temperature sensing device, such as a thermistor. The use of thermistors and other temperature sensors for controlling heaters is well known to persons skilled in the art.

The temperature sensor 46 is adapted to communicate with a heater 85 to heat the vaporizer chamber 30 as needed to maintain at least a minimum threshold temperature. The temperature sensor 46 and heater 85 may also communicate via first printed circuit (PC) board 75 and/or second PC board 80.

The heater 85 at least partially surrounds the vaporizer chamber 30 and may also at least partially surround the flow meter device 50. In one embodiment (not shown), the heater 85 surrounds portions of the bottom 35 and the four walls 36 of the vaporizer chamber, and may also at least partially surround the top 37 as well. The heater 85 may also partially surround the connected flow meter device 50, at least as it extends upwardly from the wall 36 of the vaporizer chamber 30, as well as on the top 58 of the flow meter device 50 between the proportional control valve 60 and the pressure sensor 64. Additionally, the heater 85 may surround a portion of the pressure sensor 64.

In one embodiment of the present invention, the heater 85 requires an output of only approximately 42 W for 500 grams of liquid water 22 within the vaporizer chamber 30. The requirement is based upon the physical structure of the water vapor delivery system 10 measuring approximately 7 inches in width, approximately 3 inches in depth, and approximately 7 inches in height. The water vapor delivery system 10 further requires the maintenance of approximately a 50% duty cycle for heating, and accordingly, a 100 W heater may be suitable for heater 85. The heater 85 in one embodiment has a watt density ranging from about 1.0 to about 2.0 W/in$^2$ and is powered by an AC source (not shown) that may deliver a range from about 120 to about 208 V AC to the heater 85.

The flow meter device 50 includes a proportional control valve 60, a pressure sensor 64, and a vapor conduit 54. The proportional control valve 60 includes an inlet orifice 52 within a first cavity 51 that matches the second orifice 34 of the vaporizer chamber 30 and allows for the transfer of water vapor from the vaporizer chamber 30 to the flow meter device 50. The proportional control valve 60 further includes an outlet orifice 53 that allows for the outflow of the water vapor from the valve 60 to the vapor conduit 54. The vapor conduit 54 is connected to the control valve 60, and provides for passage of the water vapor subsequent to its discharge from the second orifice 53 of the proportional control valve 60. The vapor conduit 54 has a restricting orifice 55 through which the water vapor flows to reach a transfer cavity 56. The transfer cavity 56 has an outlet orifice 57 through which the water vapor flows out from the flow meter device 50.

In operation, liquid water 20 flows at approximately room temperature from the inlet line 40 through the flow control valve 39 and enters the vaporizer chamber 30 through the first orifice 31. A first zone 24 of the vaporizer chamber 30 is filled with liquid water 20. A second zone 26 the vaporizer chamber 30 does not contain liquid water 20. The two zones 24, 26 are separated by liquid level line 28 which is defined as the depth, d, of the volume of liquid water 20 within the vaporizer chamber 30 at any point in time. The sum of the volumes of zones 24 and 26 equals the total volume of the vaporizer chamber.

As liquid water 20 flows through inlet line 40 into vaporizer chamber 30, an external power source (not shown) delivers heat to the vaporizer chamber 30 through heater 85 which at least partially surrounds the vaporizer chamber 30 and may also at least partially surround flow meter device 50. The application of heat through heater 85 may be conducted through the bottom 35, through the four walls 36, and optionally through the top 37 of vaporizer chamber 30 such that a thermal gradient is created within the vaporizer chamber 30.

As heater 85 continues to heat vaporizer chamber 30, the temperature of the liquid water 20 within vaporizer chamber 30 begins to increase from its approximate initial room temperature of around 20 to 25° C. to a temperature where its phase begins to change from liquid to vapor. As water vapor 22 begins to form within the vaporizer chamber 30, its location within the vaporizer chamber 30 is limited to the second zone 26, which has an initial volume that is defined by the space remaining in the vaporizer chamber 30 that does not contain the liquid water 20. Thus, the second zone 22 is defined by an initial temperature, and initial pressure and an initial volume. The initial volume and the initial pressure of the second zone 22 are dependent upon the volume of the liquid water 20 in the vaporizer chamber 30 as well as the temperature of the liquid water 20 when the system is ready for start-up.

Embodiments of the present invention may provide water vapor delivery on demand, while using less overall heat energy to produce vapor than traditional systems. This is accomplished by quickly and accurately sensing and manipulating the volume and temperature of the liquid water within the vaporizer chamber to produce water vapor at temperatures generally below 100° C.

Figure 5:
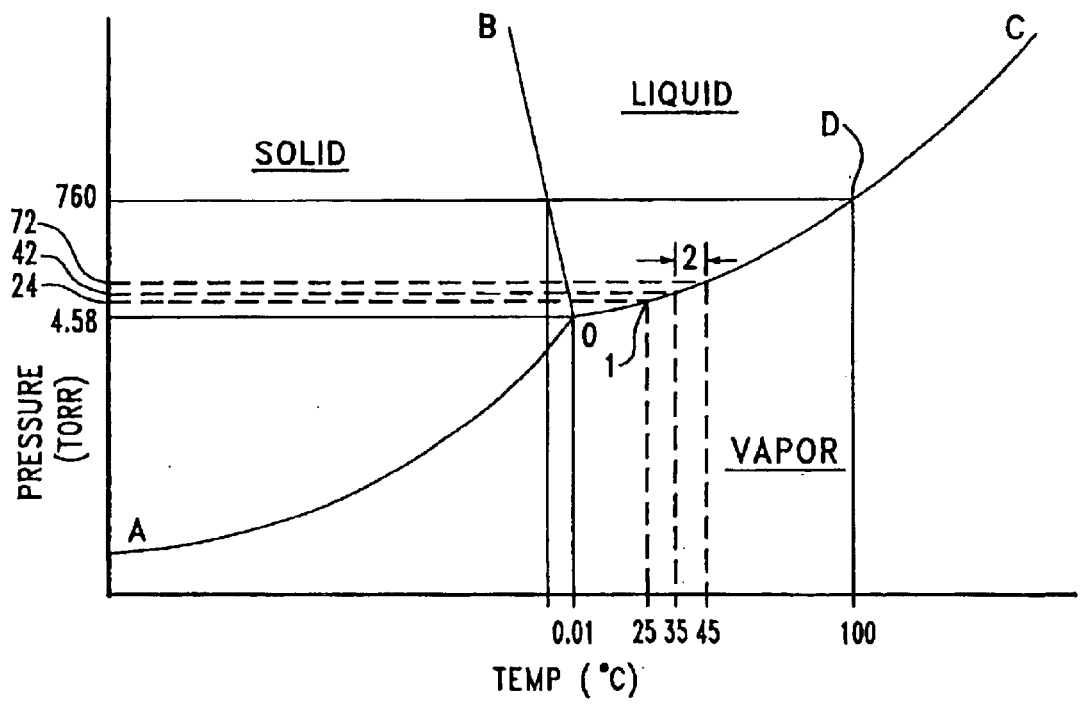
FIG. 5 is a graph that illustrates the phase diagram for water.

FIG. 5 illustrates the conditions under which water can exist as a solid, liquid, or vapor, as well as the pressure and temperature conditions (assuming a generally constant volume) that bring about changes in the state of water. Line OC is a vapor pressure curve for water. Any point along line OC describes a set of temperature and pressure conditions under which liquid and vapor can exist in equilibrium. The three curves intersect at point O, which represents the triple point of water. Solid, liquid, and vapor can exist together in equilibrium under the conditions represented by this point. Point D represents the equilibrium point under normal atmospheric conditions (760 Torr), at which water boils at approximately 100° C. The present invention is capable of producing water vapor along line OC at temperatures lower than 100° C., but without forming solid water at or below point O.

At an initial start-up point, the vapor delivery system 10 provides a volume of liquid water 20 within the vaporizer chamber 30 that is at least above a minimum threshold volume, and that is maintained by heater 85 at least above a minimum threshold temperature to provide water vapor upon demand. In one embodiment, the minimum threshold volume at start-up is approximately 500 g and the minimum threshold temperature at start-up is between about 17° C. and 30° C. The start-up point is depicted as point 1 on FIG. 5. At point 1, the temperature of the liquid water is approximately at room temperature, or around 20 to 25° C., and the pressure of the second zone 26 is approximately 760 torr.

When the water vapor delivery system 10 is turned on, a downstream pump (not shown), such as a pump used to deliver water vapor to a PFC plasma reaction system (not shown), causes the pressure in the vaporizer chamber 30 to decrease below atmospheric pressure almost immediately. As the pressure in the vaporizer chamber 30 drops, the temperature within the vaporizer chamber 30 begins to drop below the minimum threshold temperature, and the conditions represented by the line OC in FIG. 5 begin to shift from point 1 to the left, toward the triple point O. However, so long as the minimum threshold volume of liquid water 20, (i.e., about 500 g) is at the minimum threshold temperature when the water vapor delivery system 10 is turned on, the immediate drop in pressure will not cause the formation of ice within the vaporizer chamber 10, thus freezing the water vapor delivery system 10.

As soon as the temperature drops below the minimum threshold temperature, heat is instantaneously applied to the vaporizer chamber 30 through heater 85, to prevent the internal temperature from dropping to the triple point O along the OC curve. As long as the start-up conditions are satisfied, the temperature of the liquid water 20 rapidly increases through the application of heat through heater 85, the set of conditions begins to shift back to the right along the OC curve, and the operating conditions stabilize within a temperature range of 35 to 45° C., represented by the points within range 2 on the phase diagram in FIG. 5. In this manner, water vapor is provided at a temperature range of 35 to 45° C., rather than at or above 100° C. as in traditional systems. Thus, while the water temperature may momentarily fall below the minimum threshold values shortly after the system start-up, the heater rapidly raises the temperature such that the water is substantially maintained above at least the minimum threshold value.

As is clear from the forgoing, one characteristic of the present invention is that the system 10 is capable of rapidly sensing and adjusting both the liquid water volume and the liquid water temperature to provide low-temperature water vapor nearly instantaneously upon demand without the formation of solid water.

To maintain at least the minimum threshold of liquid water 20 inside the vaporizer chamber 30, the liquid level sensor 41 monitors the depth, d, of the liquid water 20, and, along with a suitable control circuit, produces a signal to the flow control valve 39 to either increase or decrease the rate of flow of liquid water 20 through the inlet line 40.

As previously discussed, one embodiment of the liquid level sensor incorporates a Reed switch 45. When the Reed switch 45 is closed, the control circuit will produce a signal to the flow control valve 29 to stop the flow of liquid water 20 through the inlet line 40. If the liquid level line 28 drops below an optimal volume, then the float 42 will fall within the vaporizer chamber 30 such that the magnet 43 will be far enough away from the Reed switch 45 to allow it to open thus producing a signal to the flow control valve 29 to once again allow the flow of liquid water 20 through the inlet line 40 and into the vaporizer chamber 30 through the inlet orifice 31 to re-achieve an optimal depth, d, of liquid water 20 within vaporizer chamber 30. In one embodiment of this invention, the liquid level sensor 41 is able to monitor, and through its related circuitry control, the liquid level line 28 to about ±1/16 in. Use of other liquid level sensors and suitable controllers for controlling liquid flow rates are well known to persons skilled in the art and need not be explained further to understand this invention.

While the volume of the liquid water 20 within the vaporizer chamber 30 is controlled by the liquid level sensor 41 in communication with the flow control valve 39, at least the minimum threshold temperature of the liquid water 20 may also be regulated to ensure equilibrium conditions are maintained between the liquid water 20 and the water vapor 22 within the vaporizer chamber 30. The temperature sensor 46 monitors the temperature in the vaporizer chamber 30, and, along with a suitable control circuit, produces a signal to a heat controller to turn up the heat. Thus, when the temperature of the liquid water 20 lowers below the minimum threshold temperature, the temperature sensor 46 communicates with the heater 85 to rapidly provide additional heat to the vaporizer chamber 30.

With the volume of the liquid water 20 held essentially constant within the vaporizer chamber 30 and with the temperature and the pressure within the vaporizer chamber 30 also held essentially constant during the operating cycle, the water vapor 22 that is created within the second zone 26 flows out of the vaporizer chamber 30, through the outlet orifice 34 and into the flow meter device 50 where its flow rate is metered for delivery downstream. The water vapor 22 enters a first cavity 51 of the proportional control valve through the inlet orifice 52 that matches the outlet orifice 34 of the vaporizer chamber 30. The proportional control valve 60 in tandem with the pressure sensor 64 located downstream from the proportional control valve 60, ensures that the flow rate of the water vapor 22 is controlled and delivered downstream in a reliable and accurate manner.

The metering process begins when the water vapor 22 in the vaporizer chamber 30 reaches a minimum threshold pressure that causes the proportional control valve 60 within the flow meter device 50 to flex upward at a distance sufficient to expose an outlet orifice 53. While the proportional control valve 60 is in an upwardly flexing position, the water vapor 22 flows from the first cavity 51 downstream and into the conduit 54 of the flow meter device 50. The conduit 54 has a flow path profile that initially has a small diameter which then opens into a larger diameter directly beneath the pressure sensor 64. The flow rate of the water vapor 22 is governed by the pressure as measured at the pressure sensor 64. In order to deliver reliable and accurate water vapor flow downstream, the pressure, and thus the flow of the water vapor 22 must be monitored in the conduit 54. A pressure sensor 64 is used to monitor the pressure in the conduit 54 and, along with a suitable control circuit, to produce a signal to the proportional control valve 60 to increase or decrease the flow of the water vapor 22. The pressure sensor may be any conventional pressure sensing device, such as a capacitance manometer, so long as it is able to effectively sense and control the rate of flow of the water vapor 22 to be delivered. For example, even a temperature sensor could be utilized to evaluate the pressure of the system.

In one embodiment of this invention, a capacitance manometer differential pressure sensor 64 is used to monitor the pressure as measured within the second cavity 54 and to control the flow rate of the water vapor 22 as it exits the proportional control valve 60. A capacitance manometer differential pressure sensor 64 may be used in this invention because it is simple, durable and very accurate.

The capacitance manometer 64 is connected in fluid flow relation to the proportional control valve 60 so that the pressure measured at the capacitance manometer 64 is at a predetermined difference less than the pressure at the proportional control valve 60. One wall (not shown) of the capacitance manometer 64 is thin enough to flex or deform as a diaphragm when the pressure measured at the capacitance manometer 64 is outside of the acceptable pressure differential between the two components 60, 64. If the pressure differential is within the acceptable range of pressures, then there will be no flexure or deformation of the wall (not shown). If the pressure differential is outside of the acceptable pressure differential between the two components 60, 64, then the diaphragm will flex outwardly. The extent of the flexure of deformation is proportional to the magnitudes of pressure differential between the pressures measured at the two components 60, 64. Therefore, the measurement of the amount of flexure is indicative of the excess differential. This excess differential produces a signal that instructs the proportional control valve 60 to reduce the flow of the water vapor 22 until the acceptable pressure differential is reestablished.

There are many ways to detect and measure the amount of flexure, such as with strain gauges, optically, and other ways that are well-known to persons skilled in the art. In the case of the capacitance manometer sensor 64, the flexure of the wall or diaphragm (not shown) is measured by detecting capacitance between the wall or diaphragm (not shown) and an adjacent metal plate (not shown). As is well known in the art, two metal plates, such as the metal wall (not shown) and the plate (not shown), when separated by a dielectric or an empty space, have a capacitance, C, when a voltage is applied between them across the dielectric or empty space. Persons skilled in the art also know how to measure capacitance C and changes in capacitance C with a sensor control circuit (not shown), and such capacitance manometers 64 are well-known and readily available to persons skilled in the art. Use of capacitance manometers and other pressure (or temperature) sensors suitable for controlling proportional (or other kinds of) control valves are also well known to persons skilled in the art.

As water vapor 22 flows through the second cavity 54 at a measured flow rate as monitored by the pressure sensor 64, and controlled by the proportional control valve 60, its pressure is less than it was upon entering the flow meter device 50 and thus its flow rate is slower as well. The pressure within the second cavity is approximately 30 torr, the decrease occurring due to the fact that the volume within the second cavity is relatively large which causes the water vapor 22 to expand. Continuing downstream, the water vapor 22 travels through a restricting orifice 55 having an effect similar to a nozzle and creating a choke flow condition. The restricting orifice 55 serves to further control the flow rate of the water vapor 22 by decreasing the downstream pressure to approximately 10 torr. The water vapor 22 upon passing through the restricting orifice 55 enters a transfer cavity 56 and then exits through an outlet orifice 57 and into an outlet line 70, which transports the reliable and accurately controlled water vapor to a PFC reaction chamber (not shown).

The vaporizer chamber 30 and the flow meter device 50 may be constructed out of stainless steel of sufficient thickness to withstand the vacuum conditions that are placed upon them within a PFC reaction system. Titanium or other such metal could also be utilized. Stainless steel may be suitable because of its thermal retention and conductivity properties so that the heat applied by heater 85 upon startup is able to quickly create a thermal gradient within the vaporizer chamber 30. Heat retention within the vaporizer chamber 30 and the flow meter device 50 is important because re-condensation of the water vapor 22 may create an oscillating or fluctuating flow pattern, which may decrease the reliability of the product delivered.

In one embodiment, the system 10 maintains a maximum flow rate of 1000 Sccm of water vapor during the operating cycle. In order to accomplish this flow rate, the temperature of the vaporizer chamber 30 may range from about 35° C. to about 45° C. and the optimal pressure of the vaporizer chamber 30 may range from about 40 torr to about 75 torr. The optimal pressure of the second cavity 54 of the flow meter device 50 is about 30 torr and the optimal pressure of the transfer cavity 56 and the exhaust line 70 is about 10 torr. These temperature-pressure conditions were derived from the vapor pressure data for pure water in Table 1 below:

TABLE 1

Vapor pressure data for pure water

| T, °C. | P, Torr | T, °C. | P. Torr | T. °C. | P, Torr | T. °C. | P. Torr |
|---|---|---|---|---|---|---|---|
| 20 | 17.54 | 30 | 31.84 | 40 | 55.36 | 50 | 92.58 |
| 21 | 18.66 | 31 | 33.71 | 41 | 58.38 | 51 | 97.28 |
| 22 | 19.84 | 32 | 35.68 | 42 | 61.54 | 52 | 102.17 |
| 23 | 21.08 | 33 | 37.75 | 43 | 64.85 | 53 | 107.27 |
| 24 | 22.39 | 34 | 39.92 | 44 | 68.31 | 54 | 112.59 |
| 25 | 23.77 | 35 | 42.20 | 45 | 71.92 | 55 | 118.14 |
| 26 | 25.22 | 36 | 44.59 | 46 | 75.71 | 56 | 123.92 |
| 27 | 26.75 | 37 | 47.10 | 47 | 79.65 | 57 | 129.93 |
| 28 | 28.36 | 38 | 49.72 | 48 | 83.78 | 58 | 136.19 |
| 29 | 30.06 | 39 | 52.48 | 49 | 88.09 | 59 | 142.71 |

EXAMPLE

Figure 6:
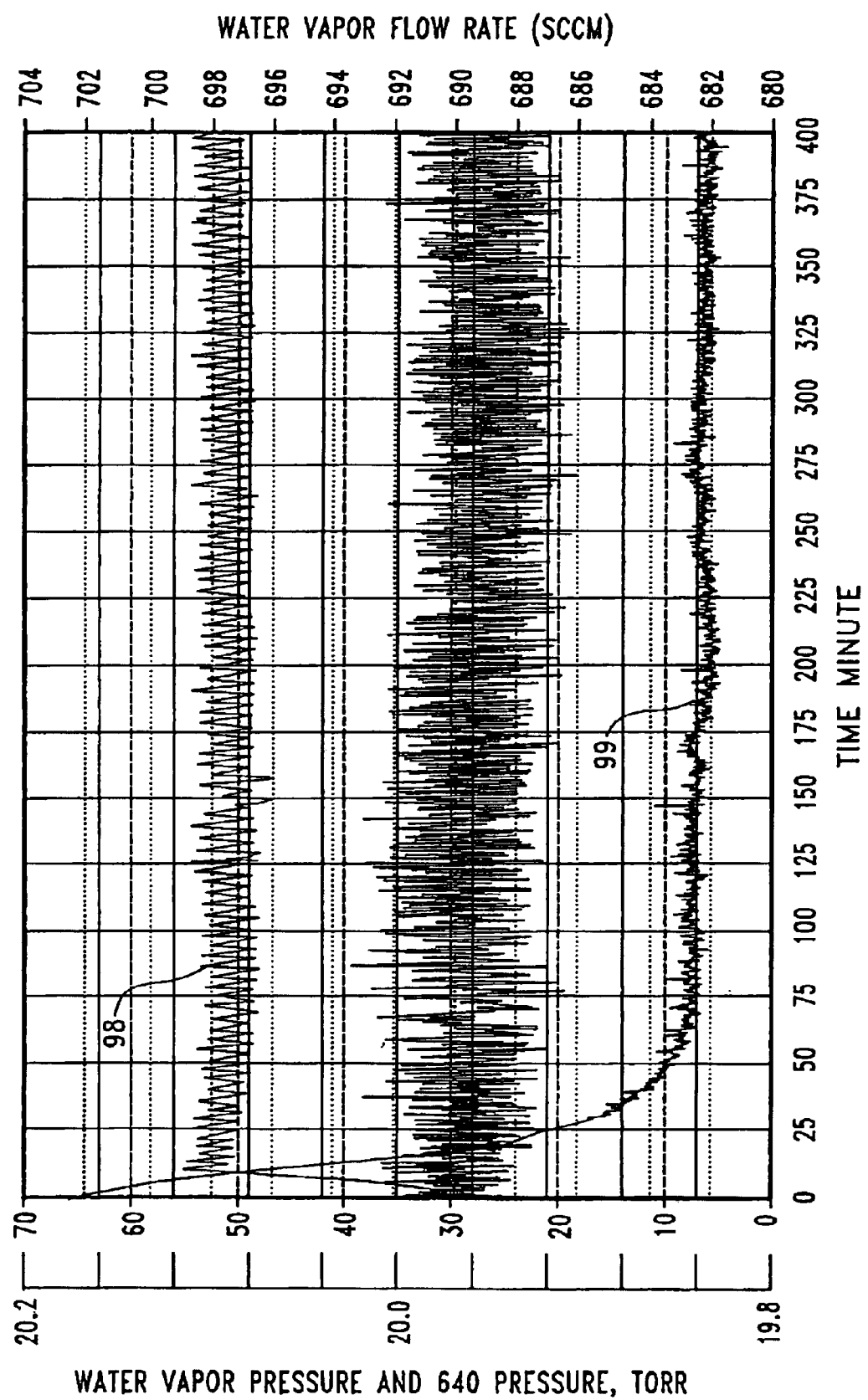
FIG. 6 is a graph that illustrates the water vapor pressure (Torr) and the water vapor flow rate (Sccm) plotted as a function of time (minutes) generated by an embodiment of the system upon start-up.

As illustrated in FIG. 6, an embodiment of the vapor delivery system 10 was able to attain a steady state water vapor pressure threshold and to provide a steady and predictable water vapor pressure flow rate exceptionally quickly. FIG. 6 illustrates that it took less than ten minutes for the water vapor delivery system 10 to reach a steady water vapor pressure level 98 at about 52 Torr that deviated minimally during the entirety of the cycle recorded (in excess of 6 hours). Further, FIG. 6 illustrates that it took less than one hour for the water vapor delivery system 10 to attain a consistent water vapor delivery flow rate 99 at about 682 standard cubic centimeters per minute (Sccm) that deviated minimally during the entirety of the cycle recorded.

This invention is not to be taken as limited to all of the details described above, as modifications and variations thereof may be made without departing from the spirit or scope of the invention.

What is claimed is:

1. A low-temperature vapor delivery system, comprising:
   a vaporizer chamber adapted to contain at least a minimum threshold volume of liquid water;
   a first control valve adapted to regulate the flow of liquid water into the vaporizer chamber;
   a liquid level sensor adapted to sense the level of liquid water in the vaporizer chamber;
   a heater adapted to affect the temperature of the liquid water within the vaporizer chamber;
   a temperature sensor adapted to sense the temperature of the liquid water in the vaporizer chamber; and
   a control system adapted to facilitate communication between the first control valve and the liquid level sensor, the heater and the temperature sensor for maintaining the liquid water at at least the minimum threshold volume at at least a minimum threshold temperature, such that upon lowering the pressure in the vaporizer chamber below about $1.013 \times 10^5$ Pascals (760 Torr), water vapor is produced within the vaporizer chamber without producing solid water.

2. The system of claim 1 wherein a portion of the liquid level sensor is adapted to contact the liquid water.

3. The system of claim 1 wherein the temperature sensor is adapted to contact the liquid water.

4. The system of claim 1 wherein the temperature sensor includes a thermistor.

5. The system of claim 1 wherein the heater contacts a portion of the vaporizer chamber.

6. The system of claim 1 wherein the vaporizer chamber comprises a top, a bottom, and four walls.

7. The system of claim 6 wherein the heater contacts a portion of each of the top, bottom, and four walls of the vaporizer chamber.

8. The system of claim 6 wherein the liquid level sensor extends into the vaporizer chamber through an orifice in the top of the vaporizer chamber.

9. The system of claim 8 wherein the liquid level sensor extends into the vaporizer chamber at about a 45° angle relative to the top of the chamber.

10. The system of claim 1 wherein the control system comprises a circuit board electrically connecting the liquid level sensor to the first control valve, and the temperature sensor to the heater.

11. The system of claim 1 further comprising a vapor flow metering device adapted to regulate vapor flow from the vaporizer chamber to an outlet line.

12. The system of claim 11 wherein the vapor flow metering device comprises:
   a second control valve adapted to control the flow of the water vapor from the vaporizer chamber to an outlet line;
   a conduit secured to the second control valve at a first end and to the outlet line at a second end, the conduit being adapted to deliver water vapor from the vaporizer chamber to the outlet line; and
   a pressure sensor secured to the conduit, the pressure sensor being adapted to communicate with the second control valve to regulate the flow of vapor to the outlet line.

13. The system of claim 11 wherein the heater contacts a portion of each of the vaporizer chamber and the vapor flow metering device.

14. The system of claim 1 wherein the minimum threshold volume is at least about 0.5 liters.

15. The system of claim 1 wherein the minimum threshold temperature is between about 17° C. and about 30° C.

16. The system of claim 1 wherein upon dropping the pressure in the vaporizer chamber below $1.333 \times 10^4$ Pascals (100 Torr), water vapor is produced within the vaporizer chamber without producing solid water.

17. A method of delivering low-temperature water vapor to an external system comprising:
   substantially maintaining at least a minimum threshold volume of liquid water in a vaporizer chamber by sensing the level of the liquid water in the vaporizer chamber and regulating flow of liquid water into the vaporizer chamber to maintain at least the minimum threshold volume;
   substantially maintaining the volume of liquid water at at least a minimum threshold temperature by sensing the temperature of the water in the vaporizer chamber and providing a sufficient amount of heat to the water in the vaporizer chamber to maintain the minimum threshold temperature;

lowering the pressure in the vaporization chamber to below about $1.013 \times 10^5$ Pascals (760 Torr) without producing solid water;

heating the liquid water to produce water vapor; and regulating delivery of the water vapor to the external system.

18. The method of claim 17 wherein the step of maintaining at least the minimum threshold volume of the water comprises maintaining the volume of the water at least about 0.5 liters.

19. The method of claim 17 wherein the step of maintaining the water at or above the minimum threshold temperature comprises maintaining the temperature of the water at between at least about 17° C. and about 30° C.

20. The method of claim 17 wherein the step of heating the water comprises heating the water to a temperature range between about 30° C. and 60° C. and maintaining the temperature of the water within the temperature range.

21. The method of claim 17 wherein the step of maintaining at least a minimum threshold volume of liquid water further comprises signaling the level of the water to a control system and instructing a first control valve to regulate the flow of liquid water into the vaporizer chamber.

22. The method of claim 17 wherein the step of maintaining the liquid water at or above the minimum threshold temperature of the liquid water comprises signaling the water temperature to a control system and instructing a heater to regulate the temperature of the water.

23. The method of claim 17 wherein the step of lowering the pressure in the vaporization chamber comprises lowering the pressure by applying a pump to the vaporization chamber.

24. The method of claim 17 wherein the step of controlling the temperature of the water to produce water vapor comprises heating the water to a temperature below about 100° C. to produce water vapor.

25. The method of claim 17 wherein the step of controlling the temperature of the liquid water comprises heating the water to a temperature between about 30° C. and 60° C. to produce water vapor.

26. The method of claim 17 wherein the step of controlling the temperature of the water to produce water vapor comprises heating the water to a temperature between about 35° C. and 45° C. to produce water vapor.

27. The method of claim 17 wherein the step of regulating the delivery of water vapor comprises maintaining a maximum flow rate of about 1000 standard cubic centimeters per minute.

28. The method of claim 17 wherein the step of regulating the delivery of water vapor comprises maintaining a flow rate between about 500 and 1000 standard cubic centimeters per minute.

* * * * *